3,072,628
OLEFIN POLYMERIZATION WITH A METAL OXIDE ACTIVATED THREE-COMPONENT CATALYST

Harry W. Coover, Jr., and George O. Cash, Jr., Kingsport, Tenn., assignors to Eastman Kodak Company, Rochester, N.Y., a corporation of New Jersey
No Drawing. Filed July 13, 1959, Ser. No. 826,437
13 Claims. (Cl. 260—93.7)

This invention relates to a new and improved process for the polymerization of olefinic hydrocarbons. In one aspect, this invention relates to a novel catalyst combination for preparing high molecular weight, solid polyolefins, such as polypropylene of high density and crystallinity. In another aspect, this invention relates to the preparation of polymers of propylene and its higher homologs using a particular catalyst combination which has unexpected catalytic activity and which results in polymeric products characterized by unusually high crystallinity.

Polyethylene has been prepared by high pressure procedures to produce relatively flexible polymers having a rather high degree of chain branching and a density considerably lower than the theoretical density. Thus, pressures of the order of 500 atmospheres and higher and usually of the order of 1,000 to 1,500 atmospheres are commonly employed in such procedures. It has been found that more dense polyethylene can be produced with certain catalyst combinations to give polymers which have relatively little chain branching and a high degree of crystallinity. The exact reason why certain catalyst combinations give these polymers of high density and high crystallinity is not fully understood. Furthermore, the activity of the catalysts ordinarily depends upon certain specific catalyst combinations, and the results are ordinarily highly unpredictable since relatively minor changes in the catalyst combination often lead to liquid polymers rather than the desired solid polymers.

Among the catalysts that have been employed to polymerize ethylene to solid crystalline polymers are combinations that include organo-aluminum compounds, such as trialkyl aluminum compounds and alkyl aluminum halide compounds in conjunction with certain inorganic halides. Thus, triethyl aluminum in conjunction with titanium tri- or tetrachloride catalyzes a polymerization reaction for the production of crystalline polyethylene. Similarly, catalytic mixtures of ethyl aluminum sesquichloride in conjunction with titanium trichloride can be used to polymerize ethylene to solid crystalline polymer. However, when catalytic mixtures of triethyl aluminum and titanium trichloride are employed to polymerize propylene the product is predominantly polymeric oils and rubbers with a comparatively small amount of high molecular weight crystalline product being formed. When a mixture of ethyl aluminum sesquichloride and titanium trichloride are employed to polymerize propylene at a comparatively low pressure, the mixture does not act as a catalyst, and substantially no polymer is formed.

Some of the catalytic mixtures that are effective for producing polyethylene cannot be used to produce crystalline, high density polypropylene. Thus, one cannot predict whether a specific catalyst combination will be effective to product crystalline, high-density polymers with specific olefinic hydrocarbons.

It is an object of this invention to provide an improved process for the polymerization of α-monoolefinic hydrocarbons to form solid, high-density, crystalline products.

It is another object of this invention to provide an improved process for the polymerization of propylene and higher α-monoolefinic hydrocarbons to produce solid, high-density, crystalline product.

It is another object of this invention to provide novel catalyst combinations which have unexpected catalytic activity for the polymerization of α-monoolefinic hydrocarbons to form crystalline, high-density polymers. Other objects of this invention will be readily apparent from the detailed disclosure.

The above and other objects of this invention are accomplished by means of this invention where in α-monoolefinic hydrocarbons either singly or in admixture are readily polymerized to high molecular weight, solid, crystalline polymers by effecting the polymerization in the presence of a catalyst composition comprising (1) a halide of a transition metal selected from the group consisting of titanium, zirconium, vanadium, chromium and molybdenum; (2) an oxide of a metal from groups IA, and II of the periodic table, and (3) at least one component selected from the following: (a) a metal from groups IA, II and IIIA of the periodic table, alkyl and hydride derivatives of the metals in groups IA, II and IIIA of the periodic table and complex metal hydrides of aluminum and alkali metal; (b) organo-aluminum halides having the formula $R_mAlX_n$ wherein R is a hydrocarbon radical selected from the group consisting of lower alkyl, cycloalkyl, phenyl and tolyl, X is a halogen selected from the group consisting of chlorine and bromine and $m$ and $n$ are integers whose sum is equivalent to the valence of aluminum; and (c) a polymeric reaction product of aluminum and a methylene halide.

The transition metal halide components of our catalyst system comprise the chlorides or bromides of a transition metal selected from the group consisting of titanium, vanadium, zirconium, chromium and molybdenum. The transition metal halides can be used at their maximum valence, and if desired, a reduced valency form of the halide can be employed. It is preferred to use the titanium chlorides which may be in the form of titanium tetrachloride, titanium trichloride and titanium dichloride. Examples of other metal halides that can be employed are titanium tetrabromide, titanium tribromide, zirconium tetrachloride, zirconium tribromide, vanadium trichloride, molybdenum pentachloride and chromium tribromide.

The catalytic mixture employed in practicing our invention also contains a metal oxide. The oxides of metals in groups IA, and II of the periodic table can be employed. More specifically oxides of alkali metals and alkaline earth metals selected from the group consisting of sodium, potassium, lithium, calcium, magnesium and barium can be employed in our catalyst compositions as well as an oxide of zinc. Specific metal oxides that can be used are sodium oxide, potassium oxide, calcium oxide, barium oxide, magnesium oxide, zinc oxide and the like. These metal oxides can be employed alone or in combination with other metal oxides in our catalyst compositions.

In addition to the metal halide and metal oxide components our catalyst composition contains another component which can be a metal, such as sodium, potassium, lithium, magnesium, zinc, aluminum and the like. The catalyst can also contain certain alkyl and hydride derivatives of these metals; for example, sodium amyl, potassium butyl, lithium propyl, aluminum triethyl, aluminum tripropyl, aluminum tributyl, zinc dibutyl, zinc diamyl, zinc dipropyl, ethyl magnesium bromide, sodium hydride, calcium hydride, lithium aluminum hydride, and the like can be employed as components of our catalyst mixture. Also, the catalyst composition may contain an organoaluminum compound, such as ethyl aluminum dichloride, cyclohexyl aluminum dichloride, cyclobutyl aluminum dibromide, ethyl aluminum dibromide, ethyl aluminum sesquichloride, ethyl aluminum sesquibromide, dimethyl aluminum bromide, propyl aluminum dichloride, dibutyl aluminum chloride, diethyl aluminum chloride and the like. Additionally, our catalyst composition can contain the polymeric reaction product of aluminum and a methylene halide, such as methylene dichloride as described in the copending application, Serial No. 549,868, filed November 29, 1955, now abandoned. The polymeric reaction product that can be used in our catalyst composition can be obtained by reacting a methylene halide, such as methylene bromide or methylene chloride, with aluminum, and the product is a complex polymeric material whose structure is not readily definable.

The inventive process is carried out in liquid phase in an inert organic liquid and preferably an inert liquid hydrocarbon vehicle, but the process can be carried out in the absence of an inert diluent. The process proceeds with excellent results over a temperature range of from 50° C. to 250° C., although it is preferred to operate within the range of from about 50° C. to about 150° C. Likewise, the reaction pressures may be varied widely from about atmospheric pressure to very high pressures of the order of 20,000 or higher. A particular advantage of the invention is that pressures of the order of 30–1000 p.s.i. give excellent results, and it is not necessary to employ the extremely high pressures which were necessary heretofore. The liquid vehicle employed is desirably one which serves as an inert liquid reaction medium.

The invention is of particular importance in the preparation of highly crystalline polypropylene, the polybutenes and polystyrene although it can be used for polymerizing ethylene and mixtures of ethylene and propylene as well as other α-monoolefins containing up to 10 carbon atoms. The polyethylene which is obtained in accordance with this invention has a softening or fusion point greater than 120° C. whereby the products prepared therefrom can be readily employed in contact with boiling water without deformation or other deleterious effects. The process of the invention readily results in solid polymers having molecular weights greater than 1000 and usually greater than 10,000. Furthermore, polymers having molecular weights of as much as 1,000,000 or higher can be readily prepared if desired. The high molecular weight, high-density polyethylenes of this invention are insoluble in solvents at ordinary temperatures, but they are soluble in such solvents as xylene, toluene or tetralin at temperatures above 100° C. These solubility characteristics make it possible to carry out the polymerization process under conditions wherein the polymer formed is soluble in the reaction medium during the polymerization and can be precipitated therefrom by lowering the temperature of the resulting mixture.

The novel catalysts described above are quite useful for polymerizing propylene to form a crystalline, high-density polymer. The polypropylene produced has a softening point above 155° C. and a density of 0.91 and higher. Usually the density of the polypropylene is of the order of 0.91 to 0.92.

The polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polyolefins obtained according to this process.

The limiting factor in the temperature of the process appears to be the decomposition temperature of the catalyst. Ordinarily temperatures from 50° C. to 150° C. are employed, although temperatures as high as 250° C. can be employed if desired. Usually, it is not desirable or economical to effect the polymerization at temperatures below 50° C., and the process can be readily controlled at temperatures not substantially above room temperature which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of a catalyst of from about 0.1% to about 2% by weight based on the weight of the vehicle. The concentration of the monomer in the vehicle will vary rather widely depending upon the reaction conditions and will usually range from about 2 to 50% by weight. For a solution type of process it is preferred to use a concentration from about 2 to about 10% by weight based on the weight of the vehicle, and for a slurry type of process higher concentrations, for example, up to 40% and higher are preferred. Higher concentrations of monomer ordinarily increase the rate of polymerization, but concentrations above 5–10% by weight in a solution process are ordinarily less desirable because the polymer dissolved in the reaction medium results in a very viscous solution.

The preferred molar ratio of component (3) to transition metal halide in our catalyst is within the range of 1:0.5 to 1:2 and the preferred molar ratio of component (3) to metal oxide in our catalyst is within the range of 1:1 to 1:50, but it will be understood that higher and lower molar ratios are within the scope of this invention. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, isooctane, methyl cyclohexane, tetralin, decalin, and any of the other well-known inert liquid hydrocarbons. The diluents employed in practicing this invention can be advantageously purified prior to use in the polymerization reaction by contacting the diluent, for example, in a distillation procedure or otherwise, with the polymerization catalyst to remove undesirable trace impurities. Also, prior to such purification of the diluent the catalyst can be contacted advantageously with polymerizable α-monoolefin.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The invention is illustrated by the following examples of certain preferred embodiments thereof, although it will be understood that the invention is not limited thereby unless otherwise specifically indicated.

Example 1

Inside a nitrogen-filled dry box the following materials were placed into a dry, 500-ml. pressure bottle: 100 ml. of dry heptane, 3 g. of a catalyst mixture which comprised a 2:3:5 molar ratio respectively of ethylaluminum sesquichloride, titanium trichloride and calcium oxide. The pressure bottle was removed from the dry box, attached to a shaking apparatus and connected to a reservoir of propylene. Shaking was initiated and the pressure bottle and its contents were heated to 75° C. under 30 p.s.i. propylene pressure and maintained under these conditions for a total of 6 hours. The reaction mixture was disconnected from the shaking apparatus and dry methanol was added to destroy the catalyst. The polymer was treated with hot isobutanol to further remove catalyst residues and then dissolved in hot xylene and filtered to remove the calcium oxide. After isolation the yield of highly crystalline polypropylene was 12.4 g., having an inherent viscosity of 3.7.

When a similar run was made using equivalent amounts of ethylaluminum sesquichloride, titanium trichloride, with no calcium oxide present, no propylene polymer was formed under the above conditions.

Example 2

Inside a nitrogen-filled dry box the following materials were placed into a 285-ml. stainless steel autoclave: 100 ml. of dry mineral spirits (B.P. 197° C.) and a total of 3 g. of a 2:3:5 molar ratio of ethylaluminum sesquichloride, titanium trichloride and calcium oxide. The autoclave was then placed in a rocker and attached to a source of liquid propylene. Dry propylene monomer (100 ml.) was added, rocking was initiated and the mixture was heated to 85° C. and maintained there for a period of 6 hours. The polymeric product was worked up as described in Example 1 to obtain a yield of 41.7 g. of highly crystalline polypropylene, having an inherent viscosity of 3.1.

When hydrogen was admitted to the polymerization zone and maintained there during the polymerization period at a pressure of 50 p.s.i., the inherent viscosity of the highly crystalline polypropylene obtained was 2.3. An increase in the hydrogen partial pressure to 500 p.s.i. produced a further reduction in inherent viscosity of the crystalline polypropylene obtained to 0.45.

Example 3

The procedure of Example 2 was followed using an autoclave and 3 g. of total catalyst; however, no solvent, i.e., mineral spirits, was used. Instead, 200 ml. of liquid propylene was added and the polymerization was run with no solvent present at 85° C. for a total of 6 hours and during this period the yield of highly crystalline polypropylene formed was 96.1 g., having an inherent viscosity of 3.9.

Example 4

The procedure of Example 2 was followed using a 2:2:10 molar ratio of ethylaluminum sesquibromide to titanium trichloride to magnesium oxide in the polymerization of 3-methyl-1-butene at a temperature of 150° C. for a 6-hr. period. From a 50-g. monomer charge, 37.2 g. of highly crystalline poly-3-methyl-1-butene of inherent viscosity 2.6 was obtained.

Example 5

The procedure of Example 2 was followed using a 1:1:1 molar ratio of ethylaluminum sesquichloride to vanadium trichloride to sodium oxide in the polymerization of 50 g. of styrene monomer at a temperature of 75° C. The yield of highly crystalline polystyrene was 42.1 g. of inherent viscosity 2.7.

Example 6

The procedure of Example 2 was followed in the polymerization of 50 g. of allylbenzene using a 2:1:15 molar ratio of cyclohexylaluminum sesquichloride to molybdenum pentachloride to zinc oxide with a polymerization temperature of 100° C. for a period of 6 hours. A 33.6-g. yield of highly crystalline polyallylbenzene of inherent viscosity 1.4 was obtained.

Example 7

The procedure of Example 2 was used to polymerize vinyl cyclohexane using 3 g. of catalyst made up of a 2:3:5 molar ratio of phenylaluminum sesquichloride, zirconium tetrachloride and calcium oxide. The yield of highly crystalline polyvinyl cyclohexane was 35.0 g. of 2.7 inherent viscosity.

Example 8

The procedure of Example 2 was used to polymerize a 50-g. charge of butadiene using 3 g. of catalyst comprising a 2:3:5 molar ratio of tolylaluminum sesquichloride to titanium trichloride to calcium oxide. The yield of polybutadiene was 24.1 g. of inherent viscosity 1.9.

Example 9

In a nitrogen filled dry box, a clean, dry, 500 ml. pressure bottle was charged with 3.0 g. of a catalyst comprising a mixture of ethylaluminum dichloride, titanium trichloride, and calcium oxide in the ratio of 1:1:20. The mixture was slurried in 100 ml. of n-heptane. The bottle was then placed on a shaking apparatus and connected to a reservoir of propylene at 30 p.s.i.g. The temperature was raised to 75° C., and the mixture was shaken under 30 p.s.i.g. propylene at 75° C. for six hours. The bottle was then cooled and vented. The catalyst residues were removed by treatment with ethnol, and then with aqueous hydrochloric acid. The yield of highly crystalline polypropylene was 11.8 g. The inherent viscosity of this product was 3.60.

Example 10

A clean, dry, stainless steel autoclave was charged with 5.0 g. of the catalyst described in Example 9. One hundred milliliters of liquid propylene was added, and the autoclave was sealed. The autoclave was placed on a rocker, and the temperature was raised to 85° C. The mixture was rocked at 85° C. for 6 hours. The autoclave was then cooled and vented. The product was treated as in Example 9 to remove catalyst residues. The yield of highly crystalline polypropylene was 41.7 g. The inherent viscosity was 3.40.

*Example 11*

The procedure of Example 10 was followed, except that the catalyst was composed of ethylaluminum dibromide, titanium trichloride, and barium oxide in the ratio of 1:1:20, respectively. The yield of highly crystalline polypropylene was 39.2 g.; the inherent viscosity was 3.35.

*Example 12*

The procedure of Example 10 was followed, except that 100 ml. of 3-methyl-1-butene was used instead of propylene. The yield of highly crystalline poly-3-methyl-1-butene was 48.1 g. The inherent viscosity was 3.15.

*Example 13*

An autoclave was charged with 5 g. of a catalyst comprising a mixture of cyclohexylaluminum dichloride, titanium trichloride, and magnesium oxide in the molar ratio of 1:1:40. The monomer was 100 ml. of 4-vinylcyclohexene. Following the procedure of Example 10, a yield of 46.1 g. of poly-4-vinylcyclohexene was obtained. The inherent viscosity of the product was 2.7.

*Example 14*

The procedure of Example 10 was followed, except that the catalyst was 6 g. of a mixture of phenylaluminum dichloride, vanadium trichloride, and calcium oxide in the ratio of 1:2:20. The monomer was 100 ml. of styrene, which was converted in 6 hours to 78.4 g. of highly crystalline polystyrene. The inherent viscosity of the product was 3.0.

*Example 15*

The procedure of Example 10 was followed, except that 100 ml. of allylbenzene was used. The yield of highly crystalline polyallylbenzene having an inherent viscosity of 2.7 was 74.3 g.

*Example 16*

The procedure of Example 10 was followed, except that 100 ml. of butadiene was used instead of propylene. The yield of polybutadiene was 48.9 g.

*Example 17*

A catalyst was prepared by heating together at 200° C. for 1 hour a mixture of 0.85 g. of sodium metal, 14.0 g. of titanium tetrachloride, and 50 g. of calcium oxide in 75 ml. of mineral oil. The mixture was stirred vigorously and kept under a nitrogen atmosphere during this reaction. The volume was made to 100 ml. with dry mineral oil.

The catalyst mixture was placed in a nitrogen-filled dry box and a 10 ml. aliquot of it was transferred to a clean, dry nitrogen-filled pressure bottle which contained 90 ml. of dry n-heptane. The bottle was attached to a shaking apparatus and connected to a reservoir of propylene at 30 p.s.i.g. The catalyst mixture was shaken at 75° C. under 30 p.s.i.g. propylene for 6 hours. The bottle was then cooled, vented, and removed from the shaking apparatus. The contents of the bottle were treated with ethanol, then with concentrated hydrochloric acid to remove catalyst residues. After washing three times with boiling water, the product was dried. The final product was 12.1 g. of highly crystalline polypropylene which had an inherent viscosity of 3.20.

*Example 18*

A 10 ml. aliquot of the catalyst mixture prepared in Example 17 was transferred to a clean, dry nitrogen-filled stainless steel autoclave. The autoclave was charged with 100 ml. of liquid propylene and rocked at 85° C. for 6 hours. The autoclave was then cooled, vented, and the catalyst residues were removed from the product as in Example 17. The yield of highly crystalline polypropylene was 40.6 g. The inherent viscosity was 3.35.

*Example 19*

A catalyst was prepared from 1.0 g. of lithium metal, 54.4 g. of titanium tetrachloride, 50 g. of calcium oxide and 65 ml. of mineral oil. After heating for 1 hour at 200° C. under $N_2$, with stirring, the mixture was cooled and made to 100 ml. total volume with mineral oil.

A 10 ml. aliquot of this catalyst was transferred to a stainless steel autoclave, the autoclave was charged with 100 ml. of liquid propylene and rocked at 85° C. for 6 hours. The autoclave was then cooled and vented. The product was isolated as in Example 17. The yield of highly crystalline polypropylene was 44.5 g. The inherent viscosity was 3.40.

*Example 20*

The procedure of Example 18 was followed, except that the propylene was replaced by 100 ml. of 3-methyl-1-butene. The yield was 49.7 g. of highly crystalline poly-3-methyl-1-butene. The inherent viscosity was 3.30.

*Example 21*

The procedure of Example 18 was followed, except that zinc oxide was used instead of calcium oxide and 100 ml. of styrene was used instead of propylene. The yield was 60.5 g. of highly crystalline polystyrene with an inherent viscosity of 2.80.

*Example 22*

The procedure of Example 19 was followed, except that the propylene was replaced by 4-vinylcyclohexene. The yield of poly-4-vinylcyclohexene was 49.6 g.

*Example 23*

The procedure of Example 19 was followed, except that 100 ml. of allylbenzene was used instead of the propylene. The yield was 77.0 g. of crystalline polyallylbenzene.

*Example 24*

The procedure of Example 19 was followed, except that 100 ml. of butadiene replaced the propylene. The yield of polybutadiene was 57.3 g.

*Example 25*

A mixture composed of 1 g. of aluminum powder, 14 g. of titanium tetrachloride, and 50 g. of dry calcium oxide was mixed with 75 ml. of mineral oil and heated at 210° C. under a nitrogen atmosphere for 1 hour. The total volume was then adjusted to 100 ml. with mineral oil.

The mixture was thoroughly mixed, and a 10 ml. aliquot was taken. This aliquot was placed in a nitrogen-filled pressure bottle containing 90 ml. of dry n-heptane. The bottle was attached to a shaking apparatus and connected to a reservoir of propylene at 30 p.s.i.g. The temperature was raised to 75° C. and the mixture was shaken under 30 p.s.i.g. propylene at this temperature for 6 hours. The bottle was then cooled and vented. The contents of the bottle were treated with concentrated hydrochloric acid to remove catalyst residues. The white polymer was washed three times with boiling water and dried. The yield of dry, highly crystalline polymer was 11.6 g. When a control mixture, containing no calcium oxide, was tested under the same conditions, only oily products were obtained.

Example 26

A 10 ml. aliquot of the catalyst mixture described in Example 25 was placed in a clean, dry, nitrogen-filled stainless steel autoclave. The autoclave was then charged with 100 ml. of liquid propylene and sealed. The autoclave was rocked at 85° C. for 6 hours. The autoclave was then cooled and vented, and the catalyst residues were removed as in Example 25. The yield of highly crystalline polymer was 42.4 g. The inherent viscosity was 3.2.

Example 27

A catalyst was prepared in the manner described in Example 25, except that magnesium oxide was used instead of the calcium oxide. When a 10 ml. aliquot of this catalyst was used in an autoclave with 100 g. of styrene at 90° C. for 6 hours a yield of 68.5 g. of highly crystalline polystyrene was obtained. The inherent viscosity was 2.8.

Example 28

A catalyst was prepared as in Example 25, except that 50 g. of barium oxide was used instead of the calcium oxide. A 10 ml. aliquot of this catalyst was used in the autoclave as described in Example 26. A yield of 40.2 g. of highly crystalline polypropylene was obtained. The inherent viscosity was 2.9.

Example 29

A 10 ml. aliquot of the catalyst described in Example 25 was placed in a clean, dry nitrogen-filled stainless steel autoclave. The autoclave was then charged with 120 g. of 3-methyl-1-butene and rocked at 85° C. for 6 hours. The catalyst residues were removed from the product as in Example 25. The yield was 97.9 g. of highly crystalline poly-3-methyl-1-butene.

Example 30

Example 29 was repeated, except that 100 g. of allylbenzene was used instead of 3-methyl-1-butene, and the temperature was increased to 100° C. The yield of highly crystalline polyallylbenzene was 76.4 g. The inherent viscosity was 3.5.

Example 31

Example 28 was repeated, except that 100 ml. of 4-vinyl-cyclohexene was used instead of propylene. The yield was 68.3 g. of poly-4-vinylcyclohexene.

Example 32

Example 29 was repeated except that the 3-methyl-1-butene was replaced by butadiene. A yield of 46.1 g. of polybutadiene was obtained.

Example 33

A clean, dry pressure bottle was charged with 2 g. of a catalyst comprising a mixture of diethylzinc, titanium tetrachloride and calcium oxide in the molar ratio of 2:1:40, respectively. To this mixture was added 100 ml. of n-heptane. The bottle was placed on a shaking apparatus, and connected to a reservoir of propylene at 30 p.s.i.g. The temperature was raised to 75° C., and the mixture was shaken at this temperature under 30 p.s.i.g. propylene for 6 hours. The bottle was then cooled and vented, and the product was treated with ethanol and aqueous hydrochloric acid to remove catalyst residues. The product was finally washed with boiling water and dried. The yield was 24.3 g. of highly crystalline polypropylene, having an inherent viscosity of 3.10. The product from a control run in which the calcium oxide was omitted was only a mixture of oily and rubbery compounds.

Example 34

One gram of the catalyst described in Example 33 was placed in a clean, dry nitrogen-filled stainless steel autoclave. The autoclave was charged with 100 ml. of liquid propylene, and heated, with rocking to 85° C. After 6 hours under these conditions, the autoclave was cooled and vented. The catalyst residues were removed from the product as in Example 33. The yield of highly crystalline polypropylene was 42.6 g. The inherent viscosity of the product was 3.30.

Example 35

Into a dry autoclave containing 75 ml. of mineral spirits (B.P. 190° C.) was placed 5 g. of a mixture of lithium aluminum hydride, titanium trichloride, and calcium oxide in the molar ratio of 2:1:20, respectively. The autoclave was then charged with 75 ml. of liquid propylene and heated with rocking to 195° C. After 6 hours at this temperature, the autoclave was cooled and vented. The product was treated with ethanol and aqueous hydrochloric acid to remove catalyst residues. The yield of highly crystalline polypropylene, having an inherent viscosity of 2.80, was 31.0 g.

Example 36

The procedure of Example 34 was followed, except that the propylene was replaced by 100 ml. of 3-methyl-1-butene. The yield of highly crystalline poly-3-methyl-1-butene was 52.1 g. The inherent viscosity was 3.25.

Example 37

At 110° C., 100 g. of allylbenzene was rocked in the autoclave with 5 g. of catalyst mixture of lithium aluminum tetraethyl, titanium trichloride, and magnesium oxide, in the ratio of 1:1:20. After 6 hours, 83 g. of crystalline polyallylbenzene was isolated from the reaction product. The inherent viscosity was 3.10.

Example 38

The procedure of Example 37 was followed, except that 100 g. of 4-vinylcyclohexene was used instead of the allylbenzene. The yield was 80.1 g. of poly-4-vinylcyclohexene.

Example 39

The procedure of Example 37 was followed, except that the allylbenzene was replaced by 100 g. of styrene. The yield of highly crystalline polystyrene was 84.2 g. The inherent viscosity was 3.4.

Example 40

The procedure of Example 37 was followed, except that instead of allylbenzene, 100 g. of butadiene was used. The yield was 86 g. of polybutadiene.

Example 41

The procedure of Example 34 was followed, but the catalyst was composed of ethylmagnesium bromide, titanium trichloride, and calcium oxide in the ratio of 1:1:20, respectively. The yield of highly crystalline polypropylene was 42.6 g. The inherent viscosity was 4.35.

Example 42

In a nitrogen-filled dry box a clean, dry pressure bottle was charged with a mixture of 0.7 g. of titanium trichloride, 5.0 g. of calcium oxide, and 1.0 g. of the polymeric product obtained from the reaction of 9 g. of aluminum with 29 g. of methylene bromide. To this mixture, 100 ml. of n-heptane was added. The bottle was attached to a shaking apparatus and connected to a reservoir of propylene at 30 p.s.i.g. The temperature was raised to 75° C. and the catalyst mixture was shaken under 30 p.s.i.g. propylene at this temperature for 6 hours. The bottle was then cooled and vented. The product was treated with ethanol and aqueous hydrochloric acid to remove catalyst residues. The final product was 10.8 g. of highly crystalline polypropylene having an inherent viscosity of 3.30.

Example 43

A clean, dry, stainless steel autoclave was charged with 6.7 g. of a catalyst composed as described in Example 42. No solvent was added; instead, the autoclave was charged with 100 ml. of liquid propylene. The autoclave was sealed, and its temperature was raised to 85° C. while rocking. After 6 hours of rocking at 85° C., the autoclave was cooled and vented. The product was washed free of catalyst residues as in Example 42. The yield of highly crystalline polypropylene was 39.4 g. The inherent viscosity of this product was 2.90.

*Example 44*

The procedure of Example 43 was followed, except that 100 ml. of 3-methyl-1-butene was used instead of the propylene. The yield of highly crystalline poly-3-methyl-1-butene was 44.6 g. The inherent viscosity was 3.40.

*Example 45*

The procedure of Example 42 was followed, except that 0.7 g. of vanadium trichloride was used instead of titanium trichloride, and the monomer was 100 ml. of styrene. The yield of highly crystalline polystyrene was 78.2 g. The inherent viscosity was 2.8.

*Example 46*

The procedure of Example 43 was followed except that the monomer was 100 g. of allylbenzene. The yield was 80.1 g. of highly crystalline polyallylbenzene having an inherent viscosity of 3.10.

*Example 47*

The procedure of Example 43 was repeated, except that instead of propylene, 100 ml. of 4-vinylcyclohexene was used. The yield of poly-4-vinylcyclohexene was 51.0 g.

*Example 48*

The procedure of Example 43 was followed, except that butadiene was the monomer instead of propylene. The yield of polybutadiene was 48.7 g.

*Example 49*

The procedure of Example 43 was followed, except that 100 ml. of 1-butene was used instead of propylene. The yield of crystalline poly-1-butene was 37.2 g. The inherent viscosity was 3.15.

Thus, by means of this invention polyolefins, such as polyethylene, polypropylene and polymers of higher molecular weight hydrocarbons, are readily produced using a catalyst combination whose activity, based on the knowledge of the art, could not have been predicted. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments, and the like, or mixed with other polymeric materials, waxes and the like. In general, aside from the relatively higher values for such properties as softening point, density, stiffness and the like, the polymers embodying this invention can be treated in similar manner to those obtained by other processes.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures: for example, by washing with water or lower aliphatic alcohols such as methanol.

The catalyst compositions have been described above as being effective primarily for the polymerization of α-monoolefins. These catalyst compositions can, however be used for polymerizing other α-olefins, and it is not necessary to limit the process of the invention to monoolefins. Other α-olefins that can be used are butadiene, isoprene, 1,3-pentadiene and the like.

Although the invention has been described in considerable detail with reference to certain preferred embodiments thereof, variations and modifications can be effected within the spirit and scope of this invention as described hereinabove and as defined in the appended claims.

We claim:

1. In the polymerization of propylene to form solid, crystalline polymer, the improvement which comprises effecting the polymerization in the presence of a catalytic mixture comprising as essential active components aluminum metal, titanium tetrachloride and calcium oxide, the molar ratio of aluminum metal to calcium oxide being within the range of 1:1 to 1:50.

2. In the polymerization of propylene to form solid, crystalline polymer, the improvement which comprises effecting the polymerization in the presence of a catalytic mixture comprising as essential active components titanium trichloride, calcium oxide and the polymeric reaction product of aluminum metal and methylene bromide, the molar ratio of said polymeric reaction product to calcium oxide being within the range of 1:1 to 1:50.

3. In the polymerization of propylene to form solid, crystalline polymer, the improvement which comprises effecting the polymerization in the presence of a catalytic mixture comprising as essential active components ethyl aluminum dichloride, titanium trichloride and magnesium oxide, the molar ratio of ethyl aluminum dichloride to magnesium oxide being within the range of 1:1 to 1:50.

4. In the polymerization of propylene to form solid, crystalline polymer, the improvement which comprises effecting the polymerization in the presence of a catalytic mixture comprising as essential active components ethyl aluminum sesquichloride, titanium trichloride and calcium oxide, the molar ratio of ethyl aluminum sesquichloride to calcium oxide being within the range of 1:1 to 1:50.

5. In the polymerization of propylene to form solid, crystalline polymer, the improvement which comprises effecting the polymerization in the presence of a catalytic mixture comprising as essential active components lithium aluminum hydride, titanium trichloride and magnesium oxide, the molar ratio of lithium aluminum hydride to magnesium oxide being within the range of 1:1 to 1:50.

6. In the polymerization of an α-olefinic hydrocarbon containing 3 to 10 carbon atoms to form solid, crystalline polymer, the improvement which comprises catalyzing the polymerization with a catalytic mixture comprising as essential active components (1) a chloride of a transition metal selected from the group consisting of titanium, zirconium, vanadium and molybdenum; (2) a metal oxide selected from the group consisting of calcium oxide, magnesium oxide, sodium oxide, zinc oxide and barium oxide; and (3) at least one component selected from the following: (a) a metal selected from the group consisting of sodium, potassium, lithium, magnesium, zinc and aluminum, alkyl derivatives of said metals selected from the group consisting of sodium alkyl, potassium alkyl, lithium alkyl, alkyl magnesium halide, zinc dialkyl and aluminum trialkyl wherein the alkyl radicals contain from 1 to 5 carbon atoms, hydrides of said metals and complex metal hydrides wherein the metals are selected from the group consisting of aluminum and alkali metals; (b) organo-aluminum halides having the formula $R_mAlX_n$ wherein R is a hydrocarbon radical selected from the group consisting of lower alkyl, cycloalkyl and phenyl, X is a halogen selected from the group consisting of chlorine and bromine and $m$ and $n$ are integers whose sum is equivalent to the valence of aluminum, and (c) a polymeric reaction product of aluminum and methylene chloride, the molar ratio of component (3) to metal oxide in said catalytic mixture being within the range of 1:1 to 1:50.

7. In the polymerization of propylene to form solid, crystalline polymer, the improvement which comprises effecting the polymerization in the presence of a catalytic mixture comprising as essential active components (1) a chloride of a transition metal selected from the group consisting of titanium, zirconium, vanadium and molybdenum; (2) a metal oxide selected from the group consisting of calcium oxide, magnesium oxide, sodium oxide, zinc oxide and barium oxide; and (3) at least one component selected from the following: (a) a metal selected from the group consisting of sodium, potassium, lithium, magnesium, zinc and aluminum, alkyl derivatives of said metals selected from the group consisting of sodium alkyl, potassium alkyl, lithium alkyl, alkyl magnesium halide, zinc dialkyl and aluminum trialkyl wherein the alkyl radicals contain from 1 to 5 carbon atoms, hydrides of said metals and complex metal hydrides wherein the metals are selected from the group consisting of aluminum and alkali metals; (b) organo-aluminum halides having the formula $R_mAlX_n$ wherein R is a hydrocarbon radical selected from the group consisting of lower alkyl, cycloalkyl and phenyl, X is a halogen selected from the group consisting of chlorine and bromine and $m$ and $n$ are integers whose sum is equivalent to the valence of aluminum, and (c) a polymeric reaction product of aluminum and methylene chloride, the molar ratio of component (3) to metal oxide in said catalytic mixture being within the range of 1:1 to 1:50.

8. As a composition of matter, a catalytic mixture for the polymerization of olefinic hydrocarbons to solid crystalline polymer which comprises as essential active components (1) a chloride of a transition metal selected from the group consisting of titanium, zirconium, vanadium and molybdenum; (2) a metal oxide selected from the group consisting of calcium oxide, magnesium oxide, sodium oxide, zinc oxide and barium oxide; and (3) at least one component selected from the following: (a) a metal selected from the group consisting of sodium, potassium, lithium, magnesium, zinc and aluminum, alkyl derivatives of said metals selected from the group consisting of sodium alkyl, potassium alkyl, lithium alkyl, alkyl magnesium halide, zinc dialkyl and aluminum trialkyl wherein the alkyl radicals contain from 1 to 5 carbon atoms, hydrides of said metals and complex metal hydrides wherein the metals are selected from the group consisting of aluminum and alkali metals; (b) organo-aluminum halides having the formula $R_mAlX_n$ wherein R is a hydrocarbon radical selected from the group consisting of lower alkyl, cycloalkyl and phenyl, X is a halogen selected from the group consisting of chlorine and bromine and $m$ and $n$ are integers whose sum is equivalent to the valence of aluminum, and (c) a polymeric reaction product of aluminum and methylene chloride, the molar ratio of component (3) to metal oxide in said catalytic mixture being within the range of 1:1 to 1:50.

9. As a composition of matter, a catalytic mixture for the polymerization of olefinic hydrocarbons to solid, crystalline polymer comprising as essential active components aluminum metal, titanium tetrachloride and calcium oxide, the molar ratio of aluminum metal to calcium oxide being within the range of 1:1 to 1:50.

10. As a composition of matter, a catalytic mixture for the polymerization of olefinic hydrocarbons to solid, crystalline polymer comprising as essential active components titanium trichloride, calcium oxide and the polymeric reaction product of aluminum metal and methylene bromide, the molar ratio of said polymeric reaction product to calcium oxide being within the range of 1:1 to 1:50.

11. As a composition of matter, a catalytic mixture for the polymerization of olefinic hydrocarbons to solid, crystalline polymer comprising as essential active components ethyl aluminum dichloride, titanium trichloride and magnesium oxide, the molar ratio of ethyl aluminum dichloride to magnesium oxide being within the range of 1:1 to 1:50.

12. As a composition of matter, a catalytic mixture for the polymerization of olefinic hydrocarbons to solid, crystalline polymer comprising as essential active components ethyl aluminum sesquichloride, titanium trichloride and calcium oxide, the molar ratio of ethyl aluminum sesquichloride to calcium oxide being within the range of 1:1 to 1:50.

13. As a composition of matter, a catalytic mixture for the polymerization of olefinic hydrocarbons to solid, crystalline polymer comprising as essential active components lithium aluminum hydride, titanium trichloride and magnesium oxide, the molar ratio of lithium aluminum hydride to magnesium oxide being within the range of 1:1 to 1:50.

References Cited in the file of this patent

UNITED STATES PATENTS

| | | |
|---|---|---|
| 2,843,577 | Friedlander | July 15, 1958 |
| 2,874,153 | Bowman et al. | Feb. 17, 1959 |
| 2,886,561 | Reynolds et al. | May 12, 1959 |
| 2,899,418 | Reynolds | Aug. 11, 1959 |
| 2,946,778 | Ke et al. | July 26, 1960 |

FOREIGN PATENTS

| | | |
|---|---|---|
| 526,101 | Italy | May 14, 1955 |
| 549,466 | Belgium | Jan. 11, 1957 |

OTHER REFERENCES

"Catalysis" (Emmett), pub. by Reinhold Corp. (N.Y.), 1954, pp. 249–255 and 258–261 relied on.